M. LEITCH.
MILKING MACHINE CLAW.
APPLICATION FILED NOV. 9, 1917.

1,316,582.

Patented Sept. 23, 1919.
2 SHEETS—SHEET 1.

WITNESS:
Robt R Kitchel.

INVENTOR
Meredith Leitch
BY
Frank L. Busser
ATTORNEY.

M. LEITCH.
MILKING MACHINE CLAW.
APPLICATION FILED NOV. 9, 1917.

1,316,582.

Patented Sept. 23, 1919.
2 SHEETS—SHEET 2.

WITNESS:
Robt. R. Kitchel.

INVENTOR
Meredith Leitch
BY
Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE CLAW.

1,316,582.   Specification of Letters Patent.   Patented Sept. 23, 1919.

Application filed November 9, 1917. Serial No. 201,025.

*To all whom it may concern:*

Be it known that I, MEREDITH LEITCH, a citizen of the United States, residing at Poughkeepsie, county of Dutchess, and State of New York, have invented a new and useful Improvement in Milking-Machine Claws, of which the following is a full, clear, and exact description, reference being had to the accompanying drawings, which form a part of this specification.

My invention relates to that class of milking machines in which the teat chambers of a plurality of teat cups, usually a set of four, are connected, by a manifold or claw, to a milk pipe. The invention is applicable to claws used in connection with single chamber teat cups and to claws used in connection with double chamber teat cups, the latter including those wherein connection is afforded from the pulsation chambers of all four teat cups to a single pulsation pipe and those wherein the pulsation chambers of two teat cups are connected to one pulsation pipe and the pulsation chambers of the other two teat cups to another pulsation pipe.

The object of the invention is to so construct the claw and the connection between the same and the milk pipe leading to the pail that the separable parts may be readily dissociated to permit the milk passage of the claw to be cleaned and to permit, also, if desired, the thorough cleaning of the teat chamber of each cup and the pipe leading thereto without detaching the same from the claw.

In the embodiment of the invention herein shown the claw is formed with manifold passages adapted to connect the pulsation chambers of two teat cups to one pulsation pipe and the pulsation chambers of the other two teat cups to another pulsation pipe.

Figure 1:
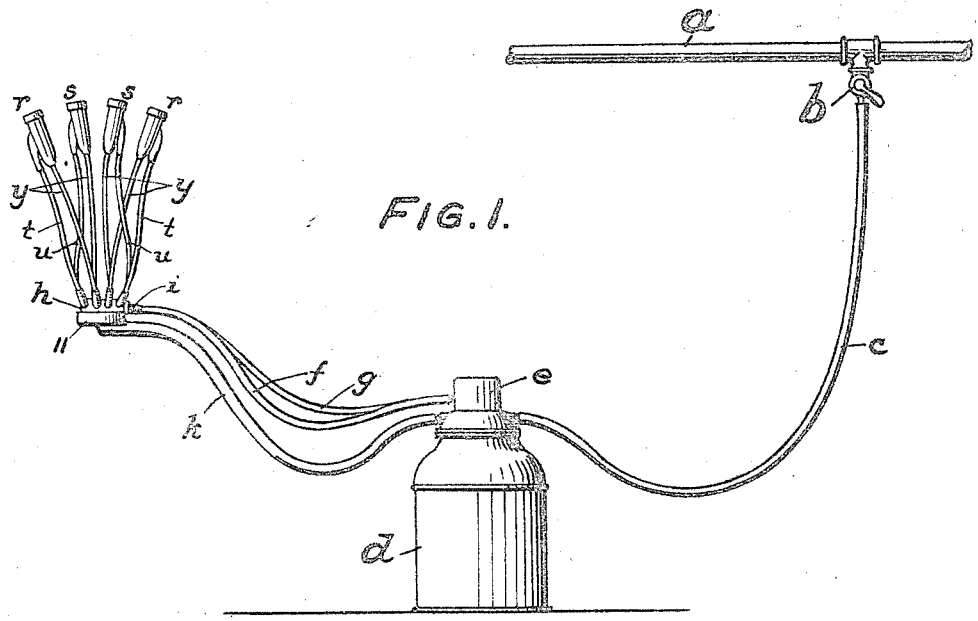
Figure 1 is a diagrammatic view of a complete installation.
Figure 2:
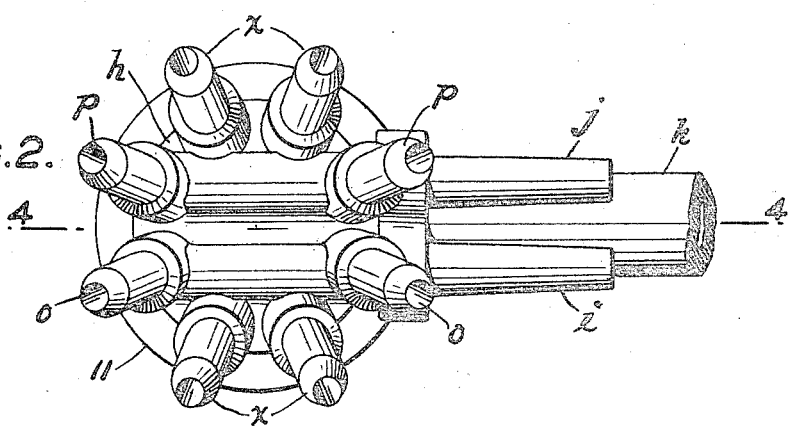
Fig. 2 is a plan view of the claw.
Figure 3:
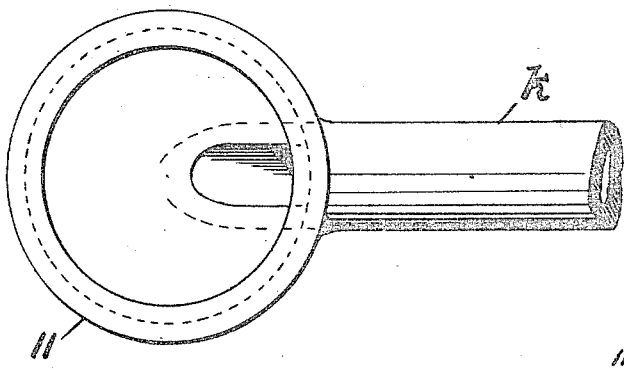
Fig. 3 is a plan view of the removable bottom of the claw.
Figure 4:
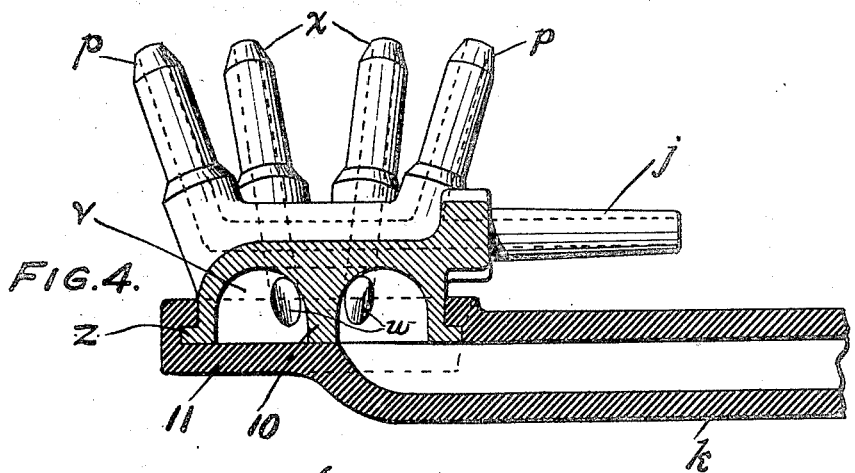
Fig. 4 is a section on the line 4—4 of Fig. 2.
Figure 5:
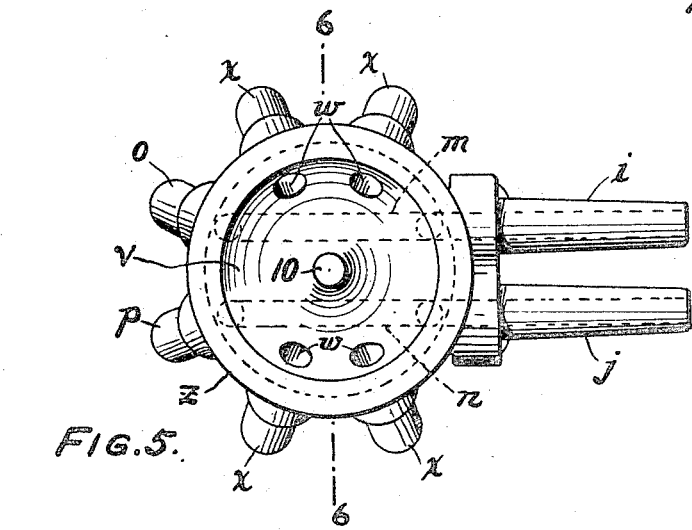
Fig. 5 is an inverted section of the claw with the bottom of the claw removed.
Figure 6:
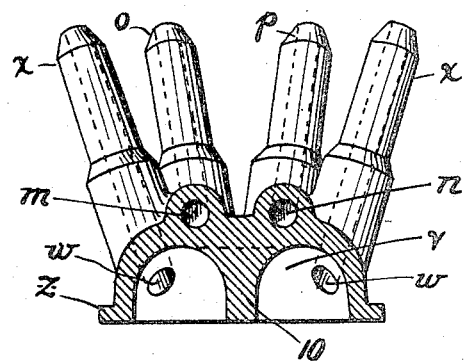
Fig. 6 is a section on the line 6—6 of Fig. 5.

A vacuum pipe line $a$ is provided with one or more cocks $b$ to which is attachable a pipe $c$ leading to a milk pail $d$. On top of the pail is a pulsator $e$ from which two pulsation pipes $f$ and $g$ extend to the claw $h$. From the milk pail to the claw extends the milk pipe $k$. The pulsator $e$ may be so constructed that pulsating suction in pipes $a$ and $c$ will produce continuous suction in pipe $k$ and pulsations in each of the pipes $f$ and $g$, the pulsations being alternate, in that when the relative pressure rises in one pipe $f$ or $g$ it drops in the other. A pulsator so constructed and connected and adapted to so operate is shown in a patent issued to me August 29, 1916, No. 1,196,001; but the pulsator, its connections, and its mode of operation form no part of the present invention and the structure is therefore not shown in detail.

The claw body is provided with two parallel, lateral, independent passages $m$ and $n$ communicating respectively with nozzles $i$ and $j$, which are on the claw and are adapted for connection respectively with the pulsation pipes $f$ and $g$. Integral with the claw are nipples $o, o,$ and $p, p,$ the two former communicating with passage $m$ and the two latter with passage $n$. The pulsation chambers of teat cups $r, r$ and $s, s$ are connected, by pipes $t, t$ and $u, u$ respectively, with the respective nipples $o, o$ and $p, p$.

The body of the claw is provided with a hollow milk chamber $v$ open at the bottom. Opening in the side walls of the milk chamber are four passages $w$, which communicate respectively with four nipples $x$ integral with the claw and adapted for connection respectively with the four milk tubes $y$ connected with the teat chambers of the respective teat cups.

Around the circular bottom of the claw body is a bead $z$ and in the center of the milk chamber, depending from its roof, is an inverted pedestal 10 having its bottom even with the under side of the claw body. A bottom member 11, of flexible and elastic material, as, for instance, soft rubber, is formed to fit closely around the bead and rest against the bottom of the pedestal 10. The milk pipe $k$ is preferably integral with the bottom 11 so that the latter completely seals the bottom of the milk chamber except for the opening therein communicating with the milk pipe $k$.

The elastic bottom 11 is easily removable from the claw body. When so removed it exposes the entire milk chamber for inspection and cleansing. If desired, a brush may be easily passed down any of the teat cups r or s and its milk tube y and out through the milk chamber v.

When the bottom 11 is in place on the claw body and connected to the pail d for operation, there is a partial vacuum in the milk chamber v. The external air will then press the bottom tightly around the bead z and tend to force it into the milk chamber v. The pedestal 10 supports the center of the bottom against this pressure and allows it to be made with a much lighter wall.

Having now fully described my invention, what I claim and desire to protect by Letters Patent is:

1. A milking machine claw comprising a body having a milk chamber, nozzles communicating therewith adapted for connection with teat cups, and a flexible and elastic chamber bottom having a milk pipe adapted for communication with a milk pail.

2. A milking machine claw comprising a body having a hollow chamber and a detachable chamber bottom adapted to be held in place by its own elasticity.

3. A milking machine claw comprising a body having a hollow chamber and a closure for the body having formed integral therewith a milk tube, said closure and tube being of flexible and elastic material.

4. A milking machine claw comprising a body having an open bottomed chamber and four milk passages extending through the body and opening into the chamber wall, and a flexible and elastic member acting as a closure for said chamber and detachable to permit cleansing of said chamber and passages.

5. A milking machine claw comprising a body having a hollow chamber and an interior depending pedestal having a free lower end, and a bottom which is both detachable and flexible and which is adapted to be held against collapsing by contact of a limited portion of its area with the lower end of the pedestal.

6. A milking machine claw comprising a body having a hollow chamber, a centrally disposed pedestal in the chamber, and a detachable bottom adapted to be held in place by its own elasticity and supported, against collapsing, by the pedestal.

7. A milking machine claw comprising a rigid body having a hollow chamber, a pedestal depending from the top of the body and having a free lower end, and a flexible and elastic chamber bottom adapted to be held by its own elasticity in position on the body and against the free lower end of the pedestal.

8. A milking machine claw comprising a body having a hollow milk chamber opening downwardly, an inverted pedestal disposed centrally in the chamber whose lower end is approximately level with the lower edge of the chamber, and a flexible elastic bottom attachable to the edge of the chamber and adapted to be supported by the pedestal.

9. A milking machine claw comprising a body having a hollow milk chamber opening downwardly, an inverted pedestal disposed centrally in the chamber whose lower end is approximately level with the lower edge of the chamber, and a flexible elastic bottom attachable to the edge of the chamber and provided with an integral milk tube adapted for connection with a source of suction, said pedestal adapted to support the bottom during operation against inward collapse by outside atmospheric pressure.

10. A milking machine claw comprising a body provided with a pulsation passage adapted for connection with a pulsation tube and with nipples communicating with said passage and adapted for connection with the pulsation chambers of teat cups and provided also with an independent milk chamber and with nipples communicating with said chamber and adapted for connection with the teat chambers of teat cups, and a flexible and elastic chamber bottom having a milk pipe adapted for communication with a milk pail.

In testimony of which invention, I have hereunto set my hand, at Poughkeepsie, N. Y., on this 3d day of Nov., 1917.

MEREDITH LEITCH.